United States Patent Office 3,790,528
Patented Feb. 5, 1974

3,790,528
PROCESS FOR PREPARATION OF
OXYBENZOYL POLYMER
Kiyoshi Tesaki and Michio Hiraoka, Tokyo, Japan, assignors to Nippon Soda Co., Ltd., Tokyo, Japan
No Drawing. Filed Dec. 27, 1971, Ser. No. 212,730
Int. Cl. C08g 17/02
U.S. Cl. 260—47 C        9 Claims

ABSTRACT OF THE DISCLOSURE

A process for preparation of oxybenzoyl polymers comprising reacting m- or p-hydroxybenzoic acids having or not having substituent on aromatic nucleus or alkaline salts thereof with acid-halogenation agent in a mole rate of 1 mole of the said hydroxybenzoic acids or alkaline salts thereof for more than 0.5 mole of acid-halogenation agent.

DETAILED EXPLANATION OF THE INVENTION

This invention relates to improvements in a process for the preparation of an oxybenzoyl polymer, and more particularly a process for the preparation of an aromatic polyester having repeating unit of the oxybenzoyl structure or a nuclear substituted oxybenzoyl structure.

It has heretofore been proposed in the U.S. Pat. No. 2,600,376, No. 2,728,747 and No. 3,039,994, to employ zinc chloride, triphenylenephosphite or tertiary amines as a catalyst for polymerization of acetoxy benzoic acids or esters thereof. However, polymer having high polymerization degree and high thermal decomposition temperature cannot be obtained in these processes.

Further in French Pat. No. 1,568,152, it is disclosed that oxybenzoyl polyester having a high polymerization degree can be obtained by an interesterification reaction from phenyl p-oxybenzoate in a solvent having a high boiling point by the use of tetrabutyl titanate as a catalysis. However, the yield of the polyester from the monomer is only from 40% to 50% at the highest and considering the expensive starting material of phenyl-p-benzoate, the process reported in the French patent is not believed to be economical process.

Accordingly, it is the object of this invention to overcome the aforementioned problems and advantages.

It is another object of this invention is to provide a process for preparation of hydroxy benzoyl polymer having or not having substituent groups in the benzene nucleus by self-polycondensation in high yield.

It is another object of this invention to provide a process for the preparation of a hydroxy benzoyl polymer, including nuclear substituted polymers, having thermal resistance, resistance to solvents, self-extinguishing and self-lubricating properties, thermal conductivity as a synthetic resin for molding.

Other objects and advantages of this invention will become further apparent hereinafter.

The inventors contemplate a process wherein hydroxybenzoic acid and their nuclear substituted derivatives may be polymerized by the reaction with an acid-halogenation agent and followed by the elimination of a hydrogen halide in the presence or absence of an inert dispersing medium.

As a result of an investigation by the inventors, the inventors found that hydroxybenzoic acids can be easily self-polycondensed by reacting with an acid-halogenation agent and heating in order to complete the self-polycondensation.

The process of the invention is carried out in the following manner: m- or p-hydroxybenzoic acids having or not having substituent on aromatic nucleus or alkaline salts thereof were reacted with an acid-halogenation agent in the presence or absence of an inert dispersing medium.

In accordance with the invention, one mole of hydroxybenzoic acids is allowed to react with more than 0.5 mole preferably 1.2–5 mole of the acid-halogenation agent in a mole ratio, either in the presence of, or in the absence of, a dispersing medium, for about more than three hours, preferably more than five hours at a temperature between 0° C. to 400° C.

Preferably, the temperature is gradually raised to a temperature of about 100° C. to 350° C. in the last stage of the reaction in order to complete the self-polycondensative reaction for more than two hours. Further, if desired, after the distillation of the acid-halogenation agent from the reaction mixture toward the end of the reaction of acid-halogenation agent, an acid acceptor which reacts with the halogenated hydrogen by-produced in the self-polycondensation reaction, can be employed in the reaction mixture at a rate of above 0.2 to 10 equivalent weight of the acid acceptor for 1 mole of hydroxybenzoic acids or salt thereof and the reaction is carried out more than 2 hours in order to obtain a finished polyester having a high degree of polymerization.

In this method, when hydroxybenzoic acids are reacted with an acid halogenation agent, at first corresponding hydroxybenzoyl chloride may be formed as an intermediate, however, self-polycondensation can be carried on without isolating the intermediate and pre-polymer or oligomer having oxybenzoyl repeating units is formed according to the progress of reaction, and the prepolymer or oligomer becomes polymer having a high molecular weight in accordance with the digestion reaction.

As typical hydroxybenzoic acids, m- or p-hydroxybenzoic acids having or not having at least one substituent selected from the group consisting of F, Cl, Br, I methyl, ethyl, propyl and butyl on the aromatic nucleus and mixtures thereof, sodium, potassium, and ammonium salts of these acids and amine salts of these acids can be self-polycondensed, and as typical acid-halogenation agent in our invention, acid-chlorination agent e.g., thionyl chloride, phosphorus trichloride, phosphorus pentachloride, phosphorylchloride and acid-bromination agent e.g. phosphoryl bromide, thionyl bromide, phosphorus tribromide, phosphorus pentabromide, can be employed.

As preferred acid acceptors, tertiary amines, e.g., tri-n-propylamine, tri-n-butylamine, N,N-diethylaniline, N,N-di-n-propylaniline, N,N-dimethyltoluidine, N,N-dimethylnaphthylamine, pyridine, picoline, can be employed in a ten equimolecular amounts for a mole of hydroxybenzoic acids used as a raw material.

As dispersing medium organic solvents, not having a reacting hydrogen atom, such as aliphatic hydrocarbons, e.g., heptane, octane, Decalin, kerosine, aromatic hydrocarbons e.g., toluene, xylene, ethylbenzene, Tetralin biphenyl, halogenated hydrocarbons, e.g., 1,1,2,2 - tetrachloroethane, chlorobenzene, bromobenzene, o-dichlorobenzene, polychloropolyphenyl, nitroaromatic hydrocarbons, e.g. nitrobenzene nitrotoluene, ethers e.g., 1,2-dimethoxyethane 1,4-dioxane, anisole, phenetole, diphenylether, aromaticpolyethers e.g., p-1,4-diphenoxybenzene, amides e.g. dimethylformamide, dimethyl-acetamide hexamethylphosphorus amide, sulfoxides e.g., dimethylsulfoxide and mixtures thereof can be employed.

Example 1

To a 500 ml. flask equiped with an air-tight-stirrer, a $N_2$ gas inlet, a thermometer, a reflux condenser, a distilling column and a gas outlet 69.1 g. of powder of dried p-hydroxybenzoic acid and 138.2 g. of polychlorodiphenyl were added and mixed to a slurry. After the atmosphere was replaced with $N_2$, 89.2 g. of thionylchloride was added dropwise into the slurry under stirring and then, the mixture was heated to a temperature of 80° C. and stirred for 5 hours at the above temperature. Further thionylchloride was distilled off, temperature of the mixture was raised to 300° C. and the reaction mixture was digested for 4 hours at the temperature.

After cooling the reaction mixture to room temperature, 200 ml. of acetone was added in the reaction mixture and the mixture was filtered and pale yellow powder obtained was further added to 150 ml. of acetone, heated for 1 hour at the reflux temperature, then filtered and washed by use of 50 ml. of acetone, and dried at 150° C. for three hours in vacuo and 59.0 g. of white powder was obtained.

This powder was insoluble in benzene, carbon tetrachloride, hexane, methylether, acetone tetrahydrofuran and dimethylformamide and when the powder was heated with concentrated sodium hydroxide solution, hydrolysis was taken place and sodium p-hydroxy benzoate was obtained.

Thermal resistance property of the powder was tested with the method of thermal gravimetric analysis.

The results were shown as follows.

| | Residual weight (percent) in— | |
|---|---|---|
| | Air | $N_2$ |
| Temperature, C.° | | |
| 400 | 98.8 | 100.0 |
| 450 | 96.0 | 98.4 |
| 500 | 93.0 | 91.6 |
| 550 | 55.1 | 61.3 |
| Temperature which decomposition occurred from | (1) | (2) |

[1] 380° C; [2] 408° C.

NOTE.—Thermal gradient is 10° C./minute.

Decrease of the weight did not occur until decomposition temperature of 380° C. in air or 408° in $N_2$.

Further, the powder showed the endothermal peak at 360° C. which is considered as the glass transition temperature in differential thermal analysis under $N_2$ but had not melting point as far as 520° C. The results of elementary analysis were C: 70.1%, H: 3.28%; O: 26.60% and Cl: less than 0.1% by weight and molecular weight was more than 30,000 and infrared spectrum of the powder showed an absorption at 1742 cm.$^{-1}$ based on esterlinkage, but did not show an adsorption at 1679 cm.$^{-1}$ base on carboxyl group of raw material.

As said above, it was confirmed that the powder was a self-polycondensation product of p-oxybenzoyl polyester having solvent resistance and heat resistance.

Example 2

To a 500 ml. flask having similar equipments shown in Example 1, 206.1 g. of dried phosphorus trichloride was fed and cooled in an ice bath under an atmosphere of $N_2$ gas. Then, 88.1 g. of mono-potassium p-hydroxy benzoate was added slowly and mixed for 6 hours at room temperature. After distilling excess phosphorus trichloride under reduced pressure, 185 g. of tri-n-butyl-amine was added into the mixture and temperature was gradually raised to 200° C. taking 2 hours and maintained for 3 hours at 200° C. After the cooling the reaction mixture to room temperature, the slurry was filtered and solid particles obtained were washed with 200 ml. of warmed water and 200 ml. of acetone, dried under reduced pressure, and 58.6 g. of white powder was obtained.

The powder showed similar results of thermal gravimetric analysis and differential thermal analysis described in Example 1.

Example 3

To a 300 ml. flask having similar equipments shown in Example 1, 34.5 g. of dried p-hydroxy benzoic acid was fed and dissolved in 138.0 g. of phenetole and 62.4 g. of thionyl bromide was added dropwise into the solution under an atmosphere of $N_2$ gas and heated gradually to 85° C., and kept at the above temperature for 3 hours.

After distilling excess thionyl bromide under reduced pressure, solid particles were precipitated by adding 37.3 g. of N,N-diethylaniline and further heating of the mixture to a temperature of 170° C. taking 2 hours and kept 5 hours at the above temperature. After cooling the reaction mixture to room temperature, the reaction mixture was post-treated as shown in Example 2, and 29.6 g. of white powder was obtained.

Example 4

To a 100 ml. flask having similar equipment shown in Example 1, mixture of 9.2 g. of phosphoryl chloride and 8.0 g. of kerosene having boiling temperature between 280° C. to 300° C. were fed and cooled in an ice bath, and then 16.0 g. of sodium m-hydroxy benzoate was gradually added and stirred under an atmosphere of $N_2$ gas for 4 hours at a room temperature.

After distilling excess phosphoryl chloride under reduced pressure, the temperature of the mixture was raised to 290° C. taking 2 hours and the mixture was stirred at 2 hours at the temperature. After cooling the reaction mixture to room temperature, the reaction mixture was post-treated as shown in Example 2, and 10.7 g. of white powder were obtained.

The powder is soluble in o-cresol and showed a melting point of 205° C. to 240° C. and a inherent viscosity of 0.9.

Example 5

Example 1 was repeated except that 100 ml. flask and 15.2 g. of 3-methyl, 4-hydroxy benzoic acid, 30.4 g. of polychlorodiphenyl and 17.8 g. of thionyl chloride were employed, and 11.7 g. of white powder was obtained as the final product.

The final product showed elementary analysis of C: 71.8%, H:4: 43%, O: 23.77%, Cl: less than 0.1% by weight and the decrease of weight occurred at 387° C. in air by thermal gravimetric analysis.

Example 6

To a flask shown in Example 1, 69.4 g. of phosphorus pentachloride and 240.0 g. of Tetralin were fed and cooled in an ice bath and then 80.0 g. of dried powder of sodium p-hydroxy benzoate was gradually added under atmosphere of $N_2$ gas and mixed for 6 hours at room temperature. After distilling excess phosphoryl chloride under reduced pressure, 47.0 g. of γ-picoline was gradually added into the mixture and temperature of the mixture was raised to 140° C. taking 2 hours and maintained for 8 hours under agitation.

After cooling of the reaction mixture to room temperature, the mixture was post-treated according to Example 2 and 59.1 g. of white powder was obtained as the final product.

Example 7

Example 1 was repeated except that 100 ml. flask, 29.8 g. of sodium 2,3,5,6-tetrachloro-4-hydroxybenzoate, 59.6 g. of polychlorodiphenyl and 23.8 g. of thionyl chloride were employed, and 25.1 g. of final product was obtained.

The results of elementary analysis of the final product were C: 32.81%, Cl: 55.10%, O: 12.09% and H: less than 0.1% by weight. The product did not show a melting point as far as 530° C. in an atmosphere of $N_2$ gas.

Example 8

Example 2 was repeated except that 100 ml. flask, mixture of 8.0 g. of sodium p-hydroxybenzoate and 8.0 g. of sodium m-hydroxybenzoate as a monomer, 41.2 g. of phosphorus trichloride and 37.0 g. of tri-n-butylamine were employed, and 11.0 g. of white powder was obtained as the final product.

The powder was soluble in hot o-cresol and showed a melting point of 295° C. to 315° C.

What is claimed is:

1. A process for the preparation of a heat resistant, solvent resistant, self-extinguishing, self lubricating oxybenzoyl polymer with good thermal conductivity comprising reacting an m- or p-hydroxybenzoic acid having or not having a substituent on the aromatic nucleus, said substituent being selected from the group consisting of: fluorine, chlorine, bromine, iodine, methyl, ethyl, propyl and butyl and mixtures or a salt thereof, selected from the group consisting of: sodium, potassium, ammonium and amine salts; with an acid-halogenation agent selected from the group consisting of: thionyl chloride, phosphorus trichloride, phosphorus pentachloride, phosphorylchloride, phosphoryl bromide, thionyl bromide, phosphorus tri-bromide, phosphorus pentabromide; in a mole ratio of: 1 mole of the said hydroxybenzoic acid or salt thereof with 0.5 to 5 moles of said acid-halogenation agent for about more than 3 hours at a tempertaure of between 0° C. to 400° C.

2. A process according to claim 1 including the steps of: removing the residual acid-halogenation agent from the reaction by distillation, and adding a tertiary amine as an acid acceptor into the reaction mixture, said tertiary amine being selected from the group consisting of: tri-n-propyl-amine, tri-n-butylamine, N,N-diethylaniline, N,N-di-n-propylaniline, N,N-dimethylotoluidine, N,N-dimethylnaphtylamine, pyridine, picoline; in ratio of ten equivalent weight amounts of said amine for one mole of said hydroxybenzoic acid used as a raw material; and maintaining at a reaction mixture temperature of more than 100° C. for more than 2 hours as a digestion reaction.

3. A process according to claim 2 wherein said acid acceptor tertiary amine is employed in a ratio of 0.2 to 10 weight equivalent of acid acceptor for one mole of hydroxybenzoic acid or salt thereof, said digestion reaction temperature being between 100° C. to 350° C.

4. A process according to claim 1 wherein the reaction is carried out in the presence of an organic solvent dispersing medium, said solvent being free of a reactive hydrogen atom.

5. A process according to claim 2 wherein the reaction is carried out in the presence of an organic solvent dispersing medium, said solvent being free of a reactive hydrogen atom.

6. A process according to claim 3 wherein the reaction is carried out in the presence of an organic solvent dispersing medium, said solvent being free of a reactive hydrogen atom.

7. A process according to claim 4 wherein said organic solvent dispersing medium is selected from the group consisting of heptane, octane, Decalin, kerosene, toluene, xylene, ethylbenzene, Tetralin, biphenyl, 1,1,2,2-tetrachloroethane, chlorobenzene, bromobenzene, o-dichlorobenzene, polychloropolyphenyl, nitrobenzene nitrotoluene, 1,2-dimethoxyethane, 1,4-dioxane, anisole, phenetole, diphenylether, p - 1,4 - diphenoxybenzene, dimethylformamide, dimethylacetamide, hexamethylphosphorus amide, dimethylsulfoxide and mixture thereof.

8. A process according to claim 5 wherein said organic solvent dispersing medium is heptane, octane, Decalin, kerosene, toluene, xylene, ethylbenzene, Tetralin biphenyl, 1,1,2,2-tetrachloroethane, chlorobenzene, bromobenzene, o - dichloro - benzene, polychloropolyphenyl, nitrobenzene, nitrotoluene, 1,2-dimethoxyethane, 1,4-dioxane, anisole, phenetole, diphenylether, p-1,4-diphenoxybenzene, dimethylformamide, dimethylacetamide hexamethylphosphorus, amide, dimethylsulfoxide and mixture thereof.

9. A process according to claim 6 wherein said organic solvent dispersing medium is heptane, octane, Decalin, kerosene, toluene, xylene, ethylbenzene, Tetralin biphenyl, 1,1,2,2-tetrachloroethane, chlorobenzene, bromobenzene, o-dichloro-benzene, polychloropolyphenyl, nitrobenzene, nitrotoluene, 1,2 - dimethoxyethane, 1,4-dioxane, anisole, phenetole, diphenylether, p-1,4-diphenoxybenzene dimethylformamide, dimethylacetamide hexamethylphosphorus amide, dimethylsulfoxide and mixture thereof.

References Cited

UNITED STATES PATENTS

| | | | |
|---|---|---|---|
| 2,600,376 | 6/1952 | Caldwell | 260—47 |
| 3,039,994 | 6/1962 | Gleim | 260—47 |
| 3,549,593 | 12/1970 | Takekoshi | 260—47 |

LESTER L. LEE, Primary Examiner